United States Patent [19]

Pipon et al.

[11] Patent Number: 4,738,156

[45] Date of Patent: Apr. 19, 1988

[54] RECTILINEAR JACK BLOCKED BY ROLLERS IN AN INDIFFERENT POSITION

[75] Inventors: Yves Pipon; Georges Droulon, both of Orne, France

[73] Assignee: A & M Cousin Etablissements Cousin Freres, Flers, France

[21] Appl. No.: 947,756

[22] Filed: Dec. 29, 1986

[30] Foreign Application Priority Data

Dec. 30, 1985 [FR] France .................... 85 19419

[51] Int. Cl.⁴ .............................................. G05G 5/16
[52] U.S. Cl. ........................................ 74/531; 188/67; 297/375
[58] Field of Search ............................ 74/531; 188/67; 297/375

[56] References Cited

U.S. PATENT DOCUMENTS

| | | | |
|---|---|---|---|
| 3,793,903 | 2/1974 | Pellman | 188/67 X |
| 3,893,730 | 7/1975 | Homier et al. | 188/67 X |
| 4,407,166 | 10/1983 | Protze et al. | 188/67 X |
| 4,583,621 | 4/1986 | Tangorra | 188/67 |
| 4,592,591 | 6/1986 | Wiers | 188/67 X |

Primary Examiner—Allan D. Hermann
Attorney, Agent, or Firm—Browdy and Neimark

[57] ABSTRACT

The rectilinear jack comprises a cage defining an inner chamber at an upper portion while a lower portion of the cage is thinned out in order to form an end lug with a hole for fixation of the cage. The upper portion of the cage is substantially of a lozenge shape for enclosing a cam with two noses placed substantially at 120° with respect to each other. The cam displaces two substantially V-shaped parts bearing on inclined inner walls of the inner chamber while an open lower portion thereof contains trains of rollers kept in engagement with the above parts by a spring. The trains of rollers bear on an upper portion of a jack stem having at least one connection head.

6 Claims, 2 Drawing Sheets

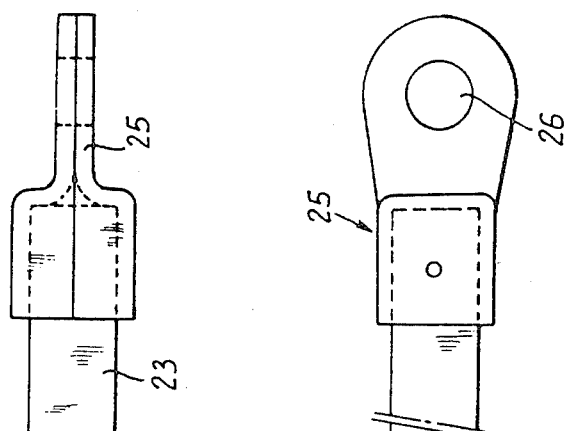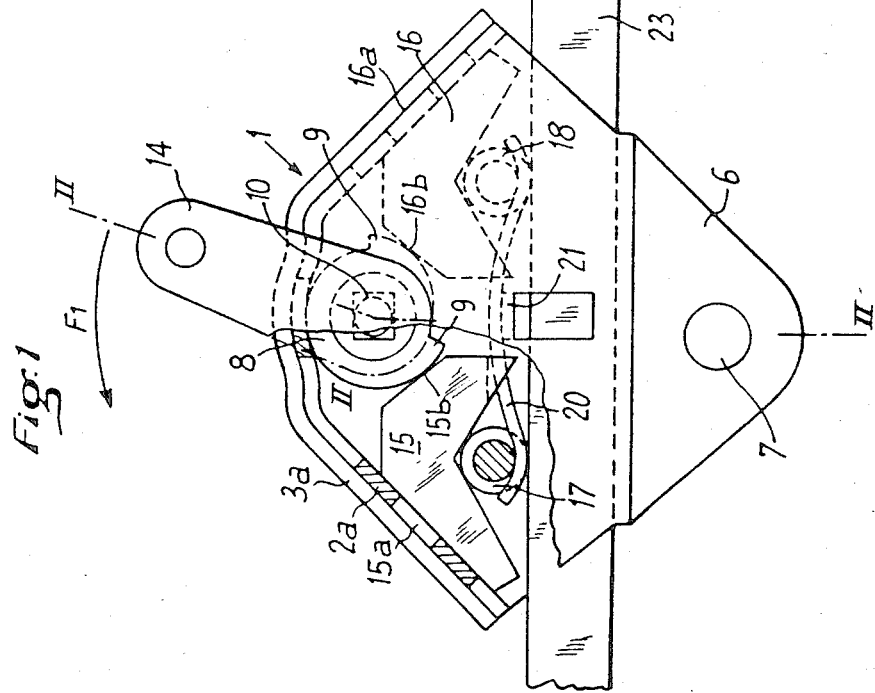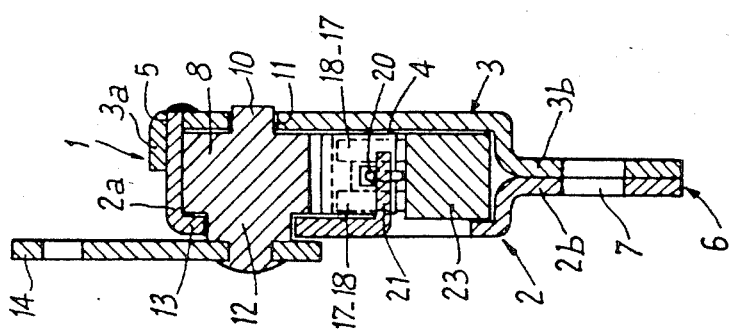

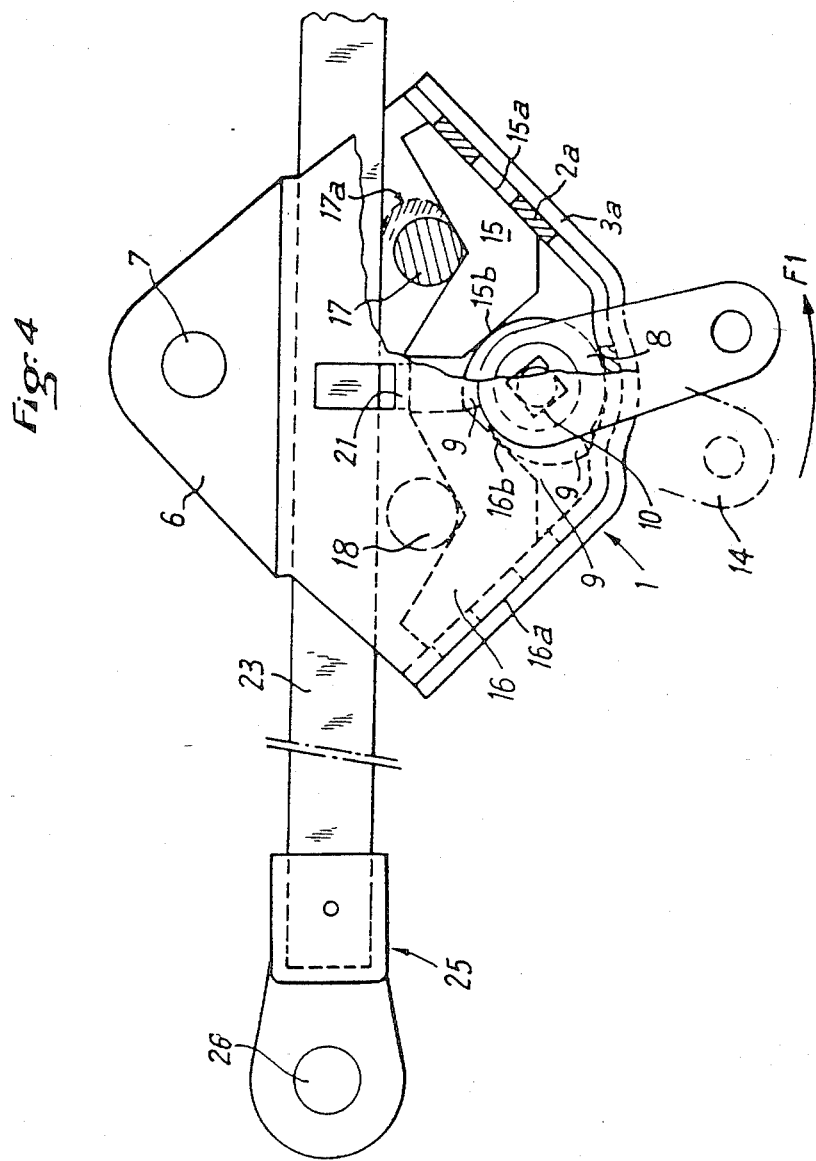

RECTILINEAR JACK BLOCKED BY ROLLERS IN AN INDIFFERENT POSITION

BACKGROUND OF THE INVENTION

The present invention relates to a rectilinear jack in which the stem of the jack can be blocked in any position between a minimum point and a maximum point.

Jacks are already known, used with various mechanisms related with seats, particularly motor vehicle seats, in order to provide, via a displacement of the jack stem, either a tilting of the seat back or a setting in height of the seat sitting portion, and some of them are even used as a seat slide for setting horizontally the position of a seat.

However, the use of such rectilinear jacks which has become general in the last years, is limited by the fact that, whatever their operation mode: that is hydraulic, blocked by jamming rings or using an endless screw and a screw-nut, their principles of implementation are costly because of the necessary quality requirements of their components.

The simple concept of the present invention consists in the use of an assembly of little accurate parts forming a rectilinear jack which can be blocked by rollers in any indifferent position between a minimum point and a maximum point, whereby the jack stem is mobile and the blocking device fixed or, reversely, the blocking device is mobile and the jack stem fixed.

SUMMARY OF THE INVENTION

According to the invention, there is provided a rectilinear jack blocked by rollers in any indifferent position, comprising a cage defining an inner chamber and having means for fixation of the cage, said inner chamber having inclined inner walls and containing a cam with two noses placed substantially at 120° with respect to each other and cooperating with two substantial V-shaped parts, each of said V-shaped parts having one side opposite the two noses of the cam and bearing on the inclined inner walls of the inner chamber while an open portion of each V-shaped part contains rollers therein, said rollers bearing on a portion of a jack stem when the cam is actuated or by mere inertia, said jack stem having at least one connection head.

According to another feature of the invention, a jack stem has a square section and bears in the lower portion of the chamber via a lower side while an inner side thereof supports the rollers.

Various other features of the invention will become more apparent from the hereafter detailed description.

BRIEF DESCRIPTION OF THE DRAWINGS

An embodiment of the invention is shown by way of a non-limiting example in the accompanying drawings, wherein:

FIG. 1 is a front elevation view, partly in cross-section, of the rectilinear jack according to the invention;

FIG. 2 is a cross-sectional view along line II—II of FIG. 1;

FIG. 3 is a partial view showing one of the ends of the jack stem.

FIG. 4 is a front elevation view, partly in cross-section, of the rectilinear jack placed vertically so as to exclude the spring acting on the rollers and ramps.

DETAILED DESCRIPTION OF THE INVENTION

In FIG. 1, a cage 1 having substantially the shape of a lozenge with inclined inner walls is made of two shells 2, 3, defining together a chamber 4. The upper portion of the shell 2 is folded over at right angle at 2a so that the peripheral portion of the fold 2a extends through openings 5 of the shell 3 the upper edge 3a of the shell 3 being crimped over the top 2a of the shell 2.

The lower portions 2b, 3b of the shells 2 and 3 are swaged so as to form an end lug 6 having a hole 7 for fixation of the cage 1 on a support.

The chamber 4 contains, in its upper portion, a cam 8 with two noses 9 placed substantially at 120° with respect to each other, this cam having on the side of the shell 3 an extension 10. This extension 10 bears inside a hole 11 formed in the upper wall of the shell 3 and forms an axis of pivotment for the cam. The other side of the cam 8 is formed with an extension 12, forming an axis of rotation and bearing inside a hole 13 of the upper portion of the shell 2.

Finally, the extension 12 maintains by any suitable means, typically by rivetting, a lever 14 the function of which will be explained hereafter.

The noses 9 of the cam 8 bear on two substantially V-shaped parts 15, 16 of a trapezoidal shape at their upper portion, so that one of their faces 15a, 16a bears underneath the shell 2 and another of their faces 15b, 16b bears against the noses 9 of the cam 8. The lower portion of the parts 15, 16 is open for receiving trains of rollers 17, 18 a portion of the periphery of which is applied permanently in a bottom of the parts 15, 16 by means of a spring 20 held in its central portion by a lug 21 formed by a bent cut-out portion made in one angle of the median portion part of the shell 2 (see FIG. 2). The lower portion of the trains of rollers 17, 18 bears on one of the sides of a stem 23 of a jack.

Thus, the spring 20 maintains fixedly via its ends the trains of rollers 17, 18 in the bottom of the parts 15, 16 which parts cooperate with the noses 9 of the cam 8. The jack stem 23, which is shown as having a square section, is housed and guided in the lower portion of the chamber 4 and can therefore move relative to the cage 1 or on the contrary be fixed between two elements, but in such a case the cage 1 can move relative to the stem 23. Both ends of the stem 23, or only one of them, carry connection heads 25 (see FIGS. 1 and 3), which heads are formed with a hole 26 for connecting the jack stem 23 either to a fixed point (when the stem 23 is fixed), or to a mobile point (when the cage 1 is maintained on a fixed point via the hole 7 of the end lug 6).

FIG. 1 shows that position of the noses 3 of the cam 8, by pushing back the parts 15 and 16 on the trains of rollers 17, 18, provides for a blockage of the cage 1 on the jack stem 23 and, when the lever 14 is permanently pulled in the direction contrary to arrow $F_1$ by a resilient member such as a spring, this blockage is maintained as long as an effort is not applied against an action of the spring for pivoting the lever 14 in direction of the arrow $F_1$ in order to unblock by rotation the noses 9 of the cam 8. Since the parts 15, 16 are no more maintained, they can move one toward the other in parallel to the inner walls of the casing 1 under action of the spring 20 maintained by a lug 21 formed by a cut-out portion of the shell 2, thereby relieving the pressure exerted by the trains of rollers 17, 18 on the jack stem 23.

Thus, at that moment, the cage 20 and the jack stem 23 are free relative to each other, and according to cases it is easy to displace either the stem 23 or the cage 1. Therefore in an application of the present invention to a seat, the seat can be moved in the following manner:

(a) for a lengthwise setting of the seat,
(b) for controlling a lifting member of the sitting portion of the seat,
(c) for controlling the inclination of the seat back.

When a desired position has been found, the only thing to do is to release the force exerted in direction of the arrow $F_1$ so that, automatically under action of the spring 20, the parts forming the rectilinear jack blocked by rollers in an indifferent position returns to the position shown in FIG. 1 by maintaining firmly the cage 1 on the stem 23.

In the foregoing disclosure, the lever 14 is controlled manually, but it is also possible to provide a motor. It should also be noted that in order to increase the rapidity of the backward motion of the rollers 17, 18 and to prevent the rollers 17, 18 from remaining in engagement with the stem 23, the value of the apex angle of the V-shaped ramps of the parts 15, 16 is smaller than that of the bearing angle of the ramps placed in the cage 1 against the inner walls of the cage 1.

FIG. 4 shows the jack disposed so as to exclude the spring 20 of FIG. 1 maintaining the rollers and pushing the ramps, and it should also be noted that this jack, when the backward motion of the rollers 17, 18 is authorized by an action, voluntary or not, exerted on the control lever 14, will enable the rollers 17, 18 to climb on the ramps 15, 16 such as shown for one of the rollers at position 17a, under action of their own inertia when an impact is applied at the very moment when these rollers are disengaged from the jack stem, and to block the jack stem 23 23 in order to prevent any displacement of a point of the fixations with respect to one another, thereby providing a device of great safety.

This safety is obtained in both directions by the rollers 17, 18 climbing on the ramps of the parts 15, 16 according to whether the inertia is directed by an impact on the front or on the rear of the vehicle, and whether it is the casing or the jack stem which is rigidly connected to the portion attached to the vehicle. It is noted that the displacement of a rollers corresponds to the continuous spacial displacement, under the effect of inertia, of the elements which are not connected to the inert base which is stopped by the impact on the vehicle.

What is claimed is:

1. A rectilinear jack blocked by rollers in an indifferent position, comprising a cage (1) defining an inner chamber (4) at an upper portion while a lower portion of the cage is thinned out in order to form an end lug (6) with a hole for fixation of the cage (1), and wherein said cage (1) is, in said upper portion, shaped for enclosing a cam (8) with two noses (9) placed substantially at 120° with respect to each other, said cam (1) displacing two generally V-shaped parts (15, 16) bearing, on a side opposite the two noses (9) of the cam (8), on inclined inner walls of the inner chamber (4) while an open lower portion thereof contains trains of rollers (17, 18) kept in engagement with said parts (15, 16) said trains of rollers (17, 18) bearing on an upper portion of a jack stem (23) having at least one connection head (25).

2. The jack according to claim 1, wherein the jack stem (23) has a square shaped section and bears in lower portion of the chamber (4) via a lower side thereof while an inner side supports the trains of rollers (17, 18).

3. The jack according to claim 1, wherein said engagement of said trains of rollers (17, 18) with said parts (15, 16) is effected by a spring (20), said spring (20) being maintained in position by a lug (21) formed by a cut-out portion of a shell (2) forming with a shell (3) the cage (1) defining the chamber (4).

4. The jack according to claim 1, wherein the cam (8) is rotatably controlled by a lever (14) rigidly connected to said cam (8) by a cam extension (12) forming an axis of rotation.

5. The jack according to claim 1, wherein the parts (15, 16) have inner angles containing the trains of rollers (17, 18), said inner angles having a value less than that of a bearing angle of outer ramps (15a, 16a) of said parts (15, 16) placed inside the cage (1).

6. The jack according to claim 1, wherein the trains of rollers (17, 18) have a position providing that, by a voluntary action on cam lever (14) or by inertia, said rollers will climb on inner ramps of the parts (15, 16) in order to block the cage (1) on the stem (23) for avoiding any untimely relative displacement of the two parts (FIG. 4).

* * * * *

UNITED STATES PATENT AND TRADEMARK OFFICE
CERTIFICATE OF CORRECTION

PATENT NO. : 4,738,156
DATED : April 19, 1988
INVENTOR(S) : PIPON et al

It is certified that error appears in the above—identified patent and that said Letters Patent is hereby corrected as shown below:

Col. 1, line 40: change "substantial" to --substantially--;
Col. 2, line 36: delete "portion";

Signed and Sealed this

Fifteenth Day of November, 1988

Attest:

DONALD J. QUIGG

Attesting Officer

Commissioner of Patents and Trademarks